US010936792B2

(12) United States Patent
Betts

(10) Patent No.: US 10,936,792 B2
(45) Date of Patent: Mar. 2, 2021

(54) HARMONIZING FONT CONTOURS

(71) Applicant: Monotype Imaging Inc., Woburn, MA (US)

(72) Inventor: William Elliott Betts, Andover, MA (US)

(73) Assignee: Monotype Imaging Inc., Woburn, MA (US)

( * ) Notice: Subject to any disclaimer, the term of this patent is extended or adjusted under 35 U.S.C. 154(b) by 0 days.

(21) Appl. No.: 15/850,853

(22) Filed: Dec. 21, 2017

(65) Prior Publication Data
US 2019/0197087 A1 Jun. 27, 2019

(51) Int. Cl.
*G06F 17/21* (2006.01)
*G06T 11/20* (2006.01)
*G06F 40/109* (2020.01)

(52) U.S. Cl.
CPC .......... *G06F 40/109* (2020.01); *G06T 11/203* (2013.01)

(58) Field of Classification Search
CPC .......... G06T 11/203; G06K 2215/0028; G06K 2215/0034; G06K 2215/0042
See application file for complete search history.

(56) References Cited

U.S. PATENT DOCUMENTS

| | | | |
|---|---|---|---|
| 4,620,287 A | 10/1986 | Yam | |
| 4,675,830 A | 6/1987 | Hawkins | |
| 4,933,866 A | 6/1990 | Markoff | |
| 5,189,730 A | 2/1993 | Kajimoto | |
| 5,214,754 A | 5/1993 | Okamoto | |
| 5,253,336 A | 10/1993 | Yamada | |
| 5,269,000 A | 12/1993 | Ohuchi | |
| 5,309,521 A | 5/1994 | Matsukawa | |
| 5,367,617 A | 11/1994 | Goossen | |
| 5,408,598 A | 4/1995 | Pryor, Jr. | |
| 5,428,728 A | 6/1995 | Lung | |
| 5,471,573 A | 11/1995 | Kaasila | |
| 5,539,868 A | 7/1996 | Hosoya | |
| 5,572,605 A | 11/1996 | Toraichi | |

(Continued)

OTHER PUBLICATIONS

Joy, A Divide and Conquer Method for Curve Drawing, 2012, http://graphics.cs.ucdavis.edu/-joy/ecs178/Unit-2-Notes/Divide-and-Conquer-Bezier-Curve.pdf (Year: 2012).

(Continued)

*Primary Examiner* — Sing-Wai Wu
(74) *Attorney, Agent, or Firm* — Fish & Richardson P.C.

(57) ABSTRACT

A system includes a computing device that includes a memory configured to store instructions. The system also includes a processor to execute the instructions to perform operations that include receiving data representing a character in multiple variants of a font. Operations also include, for each font variant, dividing the character into segments, identifying one of the segments, for each font variant, as representing an equivalent portion of the character, and, determining one minimum number of curve control points for representing each of the identified segments. Operations also include determining a representation of each of the identified segments that uses the determined one minimum number of control points, and, storing data that represents the determined representations of the identified segments for later retrieval of the character in one or more of the multiple variants of the font.

30 Claims, 12 Drawing Sheets

(56) References Cited

U.S. PATENT DOCUMENTS

| | | | |
|---|---|---|---|
| 5,638,503 A | 6/1997 | Hoel | |
| 5,673,371 A | 9/1997 | Koopman | |
| 5,687,254 A | 11/1997 | Poon | |
| 5,694,439 A | 12/1997 | Broekhuijsen | |
| 5,694,535 A | 12/1997 | Broekhuijsen | |
| 5,726,896 A | 3/1998 | Jia | |
| 5,734,388 A * | 3/1998 | Ristow | G06K 15/02 345/469 |
| 5,734,756 A | 3/1998 | Sherman | |
| 5,754,187 A | 5/1998 | Ristow | |
| 5,781,714 A | 7/1998 | Collins | |
| 5,818,459 A | 10/1998 | Kurumida | |
| 5,859,647 A | 1/1999 | Kurumida | |
| 5,870,084 A | 2/1999 | Kanungo | |
| 5,900,884 A | 5/1999 | Minami | |
| 6,295,072 B1 | 9/2001 | Pon | |
| 6,459,439 B1 | 10/2002 | Ahlquist | |
| 6,512,847 B1 | 1/2003 | Gnutzmann | |
| 6,542,157 B1 | 4/2003 | Browne | |
| 6,760,028 B1 | 7/2004 | Salesin | |
| 6,922,606 B1 | 7/2005 | Yutkowitz | |
| 6,992,671 B1 | 1/2006 | Corona | |
| 7,239,319 B2 | 7/2007 | Loop | |
| 7,263,538 B2 | 8/2007 | Hong | |
| 7,339,588 B2 | 3/2008 | Iwata | |
| 7,639,258 B1 | 12/2009 | Dowling | |
| 7,646,387 B2 | 1/2010 | Dowling | |
| 7,719,536 B2 | 5/2010 | Dowling | |
| 7,868,887 B1 | 1/2011 | Yhann | |
| 7,928,984 B1 | 4/2011 | Yhann | |
| 8,068,106 B1 | 11/2011 | Yhann | |
| 8,102,397 B2 | 1/2012 | Perry | |
| 8,274,514 B1 | 9/2012 | Martino | |
| 8,521,797 B2 | 8/2013 | Hayes | |
| 8,643,650 B1 | 2/2014 | Vinchon | |
| 8,787,677 B2 | 7/2014 | Oto | |
| 9,025,909 B2 | 5/2015 | Refstrup | |
| 9,317,777 B2 | 4/2016 | Kaasila | |
| 9,418,454 B1 | 8/2016 | Smith | |
| 9,529,778 B2 | 12/2016 | Hayes | |
| 10,146,994 B2 | 12/2018 | Jin | |
| 2002/0036639 A1 | 3/2002 | Bourges-Sevenier | |
| 2002/0105515 A1 | 8/2002 | Mochizuki | |
| 2003/0187613 A1 | 10/2003 | Cheng | |
| 2004/0006749 A1 | 1/2004 | Fux | |
| 2004/0041811 A1 | 3/2004 | Lin | |
| 2004/0090437 A1 | 5/2004 | Uesaki | |
| 2004/0189643 A1 | 9/2004 | Frisken | |
| 2005/0007365 A1 | 1/2005 | Cao | |
| 2005/0007369 A1 | 1/2005 | Cao | |
| 2005/0007381 A1 | 1/2005 | Chen | |
| 2005/0012750 A1 | 1/2005 | Uesaki | |
| 2005/0052470 A1 | 3/2005 | Hemmings | |
| 2005/0073520 A1 | 4/2005 | Papakipos | |
| 2005/0238244 A1 | 10/2005 | Uzawa | |
| 2006/0017731 A1 | 1/2006 | Matskewich | |
| 2006/0044312 A1 | 3/2006 | Loop | |
| 2006/0192781 A1 | 8/2006 | Iwata | |
| 2006/0197760 A1 | 9/2006 | Yamada | |
| 2006/0256115 A1 | 11/2006 | Cao | |
| 2007/0110289 A1 | 5/2007 | Fu | |
| 2008/0079728 A1 | 4/2008 | Sugita | |
| 2008/0256155 A1 | 10/2008 | Hayes | |
| 2009/0027396 A1 | 1/2009 | Frisken | |
| 2009/0027397 A1 | 1/2009 | Frisken | |
| 2009/0027398 A1 | 1/2009 | Frisken | |
| 2009/0141038 A1 | 6/2009 | Newaskar | |
| 2009/0225078 A1 | 9/2009 | Rossignac | |
| 2010/0060642 A1 | 3/2010 | Chhaparwal | |
| 2010/0177118 A1 | 4/2010 | Sytnikov | |
| 2010/0141659 A1 | 6/2010 | Bourd | |
| 2010/0182328 A1 | 7/2010 | Pirchio | |
| 2010/0289802 A1 | 11/2010 | Falchetto | |
| 2010/0322527 A1 | 12/2010 | Fablet | |
| 2011/0025693 A1 | 2/2011 | Merry | |
| 2011/0053532 A1 | 3/2011 | Fudaba | |
| 2011/0115797 A1 | 5/2011 | Kaplan | |
| 2011/0122139 A1 | 5/2011 | Lee | |
| 2011/0148942 A1 | 6/2011 | Furihata | |
| 2011/0164041 A1 | 7/2011 | Miura | |
| 2011/0285721 A1 | 11/2011 | Kilgard | |
| 2011/0285736 A1 | 11/2011 | Kilgard | |
| 2012/0051655 A1 | 3/2012 | Oto | |
| 2012/0154406 A1 | 6/2012 | Yuda | |
| 2012/0268794 A1 | 10/2012 | Soulard | |
| 2012/0287135 A1 | 11/2012 | Pfeifle | |
| 2013/0018636 A1 | 1/2013 | Ruf | |
| 2013/0100138 A1 | 4/2013 | Moriyama | |
| 2013/0120396 A1 | 5/2013 | Kaplan | |
| 2013/0127836 A1 | 5/2013 | Joshi | |
| 2013/0132051 A1 | 5/2013 | Hadap | |
| 2013/0147800 A1 | 6/2013 | Ogata | |
| 2013/0293554 A1 | 11/2013 | Vostrikov | |
| 2014/0015838 A1 | 1/2014 | Yoo | |
| 2014/0025194 A1 | 1/2014 | Koide | |
| 2014/0043330 A1 | 2/2014 | Ceylan | |
| 2014/0160125 A1 | 6/2014 | Yoo | |
| 2014/0176560 A1 | 6/2014 | Mayot | |
| 2014/0247276 A1 | 9/2014 | Pedrelra | |
| 2014/0320540 A1 | 10/2014 | Deach | |
| 2014/0354652 A1 | 12/2014 | Negishi | |
| 2015/0062129 A1 | 3/2015 | Wilensky | |
| 2015/0063706 A1 | 3/2015 | Lampinen | |
| 2015/0077420 A1 | 3/2015 | Bolz | |
| 2015/0142808 A1 | 5/2015 | Ren | |
| 2015/0178961 A1 | 6/2015 | Karras | |
| 2015/0178974 A1 | 6/2015 | Goel | |
| 2015/0228094 A1 | 8/2015 | Yoo | |
| 2015/0339849 A1 | 11/2015 | Iwamoto | |
| 2015/0348297 A1 | 12/2015 | Kaasila | |
| 2015/0371417 A1 | 12/2015 | Angelov | |
| 2016/0163068 A1 | 6/2016 | Uemura | |
| 2016/0180819 A1 * | 6/2016 | Chang | G09G 5/26 345/469 |
| 2016/0247029 A1 | 8/2016 | Dorum | |
| 2017/0008148 A1 | 1/2017 | Wuerfel | |
| 2017/0039739 A1 | 2/2017 | Doran | |
| 2017/0076470 A1 | 3/2017 | Yoo | |
| 2017/0169798 A1 * | 6/2017 | Chang | G06K 9/48 |
| 2017/0200292 A1 | 7/2017 | Betts | |
| 2017/0236021 A1 | 8/2017 | Petkov | |

OTHER PUBLICATIONS

Joy, Quadratic Bezier Curves, 2012, http://graphics.cs.ucdavis.edu/-joy/ecs178/Unit-2-Notes/Quadratic-Bezier-Curves.pdf (Year: 2012).

* cited by examiner

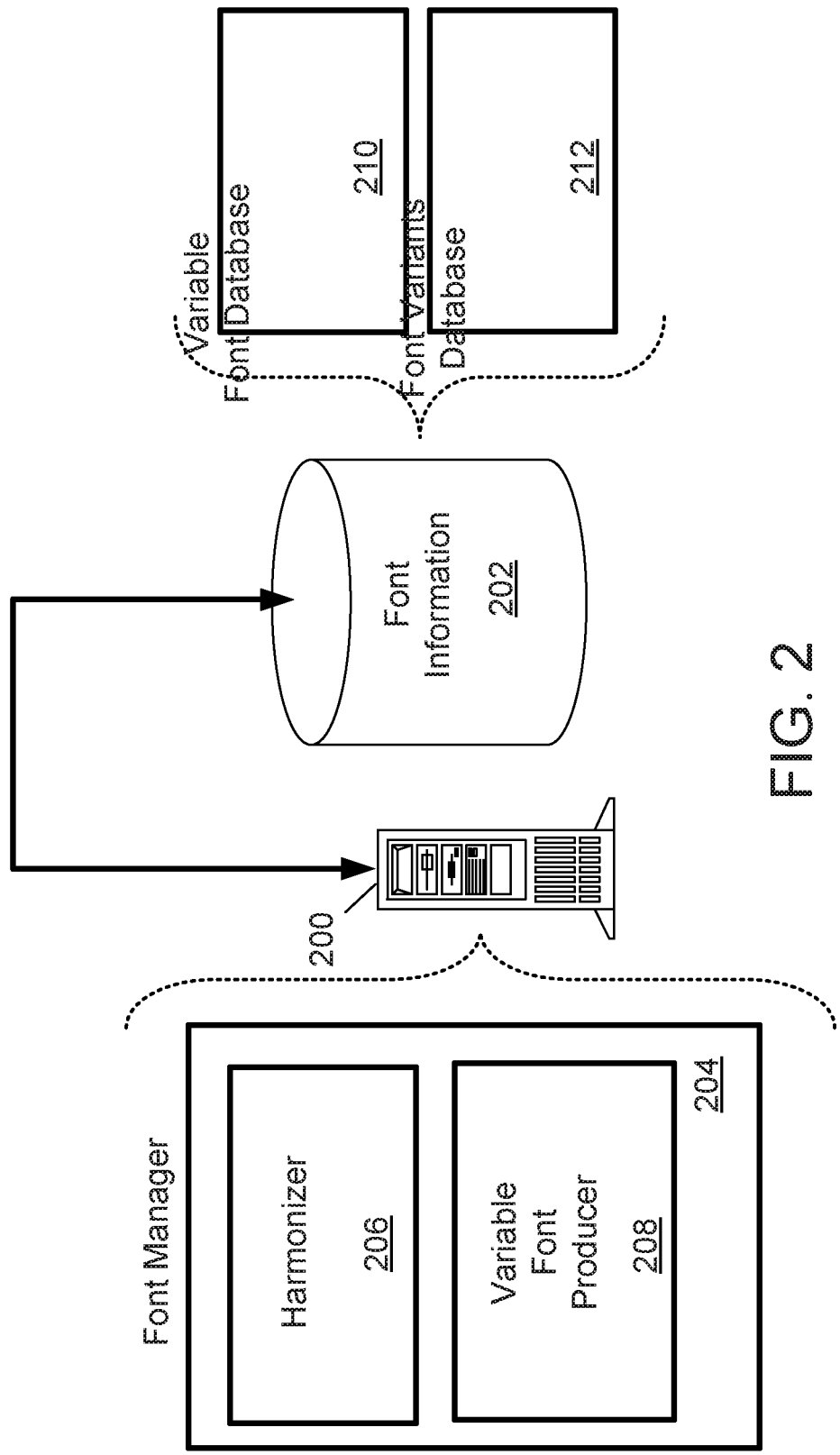

Curve Conversion code:

```
bool function CheckRight(StartTangent, StartTarget, startSegmentIndex)
    currentIndex = longest tangent that intersects StartTarget.
    intersectsStartTarget = true;
    foundSolution = false;
    while (intersectsStartTarget && (false == foundSolution))
        intersectsStartTarget = currentTangent.SegsIntersect(startTarget);
        Create the target segment of the current tangent.
        Push current tangent onto evaluation stack.
        if (target Intersects cubic end tangent) then
            foundSolution = Evaluate tangents on evaluation stack;
        else
            foundSolution = call CheckRight(Tangent, Target, currentIndex+1);
        endif
        Pop evaluation stack.
        currentIndex--;
    endwhile
```

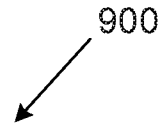

FIG. 9

HARMONIZING FONT CONTOURS

BACKGROUND

This description relates to harmonizing representations of font character shapes for producing a single font representation from which multiple variants of the font can be created.

The astronomical growth of available textual content on the Internet has lead users to demand more variety in expressing this content. Correspondingly, the number of available fonts that can represent this textual content has grown. Along with the many different types of fonts, each font is typically presentable in different typographical emphasis (e.g., bold, italic, etc.). Due to the number of variants expected by end users, a considerable amount of data could be needed by user devices to present the fonts.

SUMMARY

The systems and techniques described below create a common representation of a font that can be used to produce many variants of the font. From one single representation, all of the different typographical emphasis variants (e.g., bold, italic, etc.) can be produced. Further, by storing this one representation in a single file, less data can be efficiently transmitted to a user device. The common representation of the font can be achieved by segmenting the character and representing each character segment in a similar manner. Representing each segment by the same number and type of points (e.g., end points and control points), this common representation can efficiently transmitted and used to recreate each font variant along with different variants (e.g., a font variant that employs bold and italic emphasis). By using the same number and type of points, representations of the segments for the different variants of a font are harmonized.

In one aspect, a computing device implemented method includes receiving data representing a character in multiple variants of a font. The method also includes, for each font variant, dividing the character into segments, and, identifying one of the segments, for each font variant, as representing an equivalent portion of the character. The method also includes determining one minimum number of curve control points for representing each of the identified segments, determining a representation of each of the identified segments that uses the determined one minimum number of control points, and, storing data that represents the determined representations of the identified segments for later retrieval of the character in one or more of the multiple variants of the font.

Implementations may include one or more of the following features. The representation of each of the identified segments that uses the determined one minimum number of control points may be stored in a single variable font data file. The single variable font data file may store data representing each of the variants of the font, store data representing additional variants of the font, etc. The one minimum number of control points may be the maximum number of control points used by at least one of the identified segments. Each identified segment may be represented by an equal number of control points. Determining a representation for at least one of the identified segments may include determining one or more curves in a geometric manner that approximately track the shape of the respective segment. For each segment, each curve may a quadratic curve, a quadratic Bezier curve, etc. For each segment, each curve is a quadratic curve and data representing the one or more curves is absent data representing at least one point located at a midpoint between two control points of the quadratic curve.

In another aspect, a system includes a computing device that includes a memory configured to store instructions. The system also includes a processor to execute the instructions to perform operations that include receiving data representing a character in multiple variants of a font. Operations also include, for each font variant, dividing the character into segments, and, identifying one of the segments, for each font variant, as representing an equivalent portion of the character. Operations also include determining one minimum number of curve control points for representing each of the identified segments, determining a representation of each of the identified segments that uses the determined one minimum number of control points, and, storing data that represents the determined representations of the identified segments for later retrieval of the character in one or more of the multiple variants of the font.

Implementations may include one or more of the following features. The representation of each of the identified segments that uses the determined one minimum number of control points may be stored in a single variable font data file. The single variable font data file may store data representing each of the variants of the font, store data representing additional variants of the font, etc. The one minimum number of control points may be the maximum number of control points used by at least one of the identified segments. Each identified segment may be represented by an equal number of control points. Determining a representation for at least one of the identified segments may include determining one or more curves in a geometric manner that approximately track the shape of the respective segment. For each segment, each curve may a quadratic curve, a quadratic Bezier curve, etc. For each segment, each curve is a quadratic curve and data representing the one or more curves is absent data representing at least one point located at a midpoint between two control points of the quadratic curve.

In another aspect, one or more computer readable media storing instructions that are executable by a processing device, and upon such execution cause the processing device to perform operations that include receiving data representing a character in multiple variants of a font. Operations also include, for each font variant, dividing the character into segments, identifying one of the segments, for each font variant, as representing an equivalent portion of the character. Operations also include determining one minimum number of curve control points for representing each of the identified segments, determining a representation of each of the identified segments that uses the determined one minimum number of control points, and, storing data that represents the determined representations of the identified segments for later retrieval of the character in one or more of the multiple variants of the font.

Implementations may include one or more of the following features. The representation of each of the identified segments that uses the determined one minimum number of control points may be stored in a single variable font data file. The single variable font data file may store data representing each of the variants of the font, store data representing additional variants of the font, etc. The one minimum number of control points may be the maximum number of control points used by at least one of the identified segments. Each identified segment may be represented by an equal number of control points. Determining a representation for at least one of the identified segments may include determining one or more curves in a geometric manner that approximately track the shape of the respective segment. For each segment, each curve may a quadratic curve, a quadratic Bezier curve, etc. For each segment, each curve is a quadratic curve and data representing the one or more curves is absent data representing at least one point located at a midpoint between two control points of the quadratic curve.

These and other aspects, features, and various combinations may be expressed as methods, apparatus, systems, means for performing functions, program products, etc.

Other features and advantages will be apparent from the description and the claims.

DESCRIPTION OF DRAWINGS

FIG. 2 is a block diagram of a font manager and a data storage archive.

FIG. 9 is a listing of pseudo code instructions for harmonizing a quadratic Bezier curve representing a font character contour.

DETAILED DESCRIPTION

Figure 1:
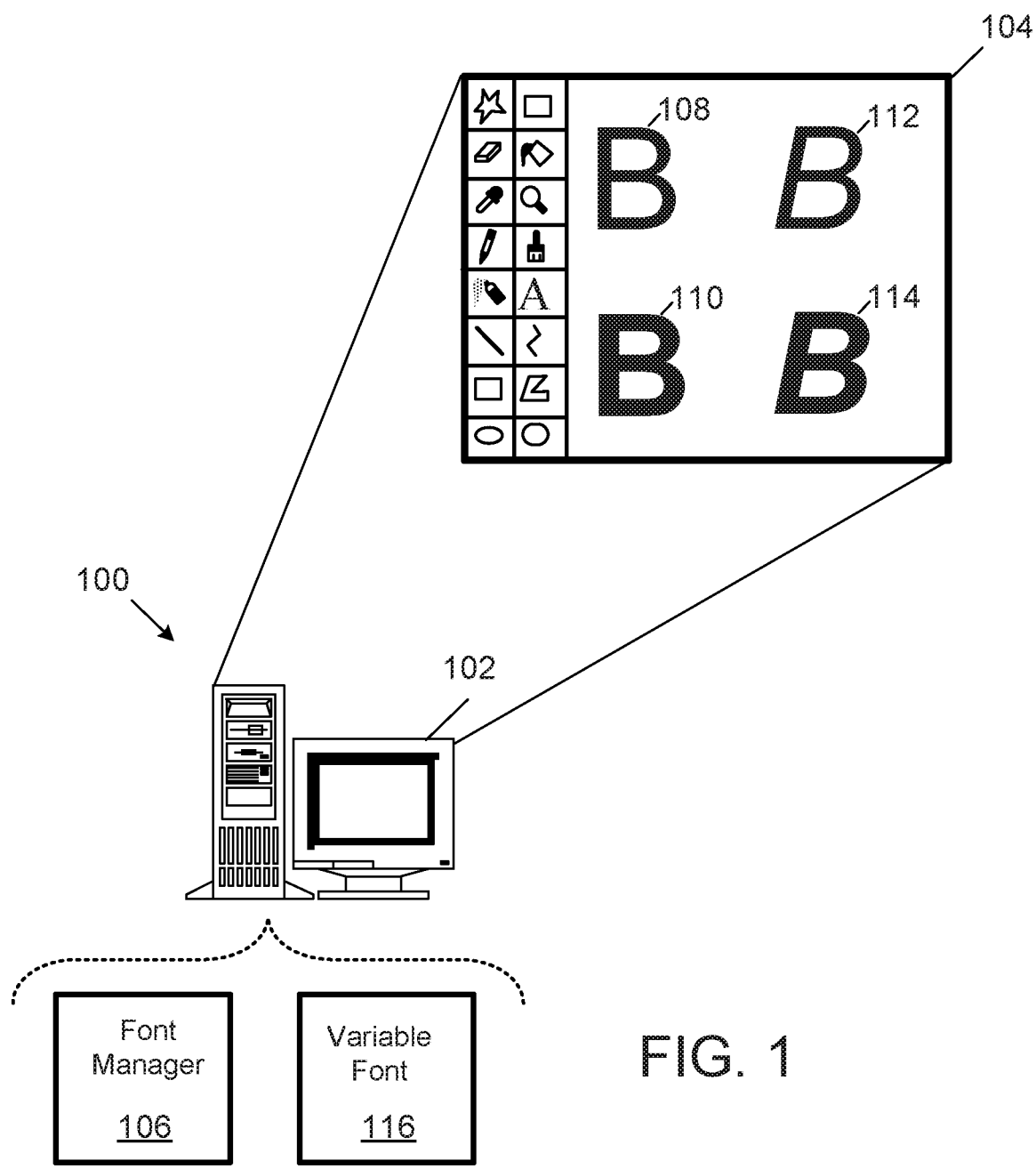
FIG. 1 illustrates a computer system presenting a font management interface.

Referring to FIG. 1, a computing device (e.g., computer system 100) includes a display 102 that presents a graphical user interface (GUI) 104 of a font manager 106 that is being executed by the computing device. Along with allowing a user to review, develop, etc. various types of fonts, the font manager 106 may provide other types of functionality such as packaging multiple members of a font family into a single representation. For example, different typographical emphasis of a font (e.g., a normal version of the font 108, a bold version of the font 110, an italic version of the font 112, a bold italic version of the font 114, etc.) can be separately represented (e.g., one font file stores data that represents the bold variant of the font, another font file stores data representing the italic variant of the font, etc.). By defining a single data set that is capable of representing all of the variants of the font, a single data file 116 (rather than separate data files) can be used for efficient transfer the font variants. Further, memory is conserved through the use of a single data file rather than a separate data files. Such single representations of multiple variants of a font can be defined in various manners; for example, a variable font that represents the variants can be stored in a single font file. Such a variable font can comply with a font format specification for scalable fonts such as the OpenType font format, for example.

For a single representation such as a variable font to represent a family of fonts, some level of commonality is needed among the individual family members. For example, the single representation can require that individual graphical elements (e.g., glyphs), portions of the elements, etc. of the family be represented in a compatible manner. Such compatibility can be achieved through one or more techniques; for example, shapes (e.g., curves) used to the define each graphical element may share some commonality. In one arrangement, the same type of shapes are employed. For example, quadratic curves, cubic curves, or another type of curve may be commonly used to define each shape of the font variants (e.g., bold characters, italic characters, etc.). In some cases, since each curve type (e.g., quadratic curves or cubic curves) is defined differently, converting from one type to another may be needed. For example, cubic curves (such as cubic Bezier curves) are represented by four points in a plane. One point represents the starting point of the curve. A second point (e.g., first control point) defines the direction that the curve departs from the start point. A third point (e.g., a second control point) defines the direction that the curve approaches an end point of the curve (i.e., the end point is the fourth point of the curve). While the first and fourth points (i.e., start and end points) lie on the path of the curve, typically the curve does not pass through the second and third points (e.g., the control points). For quadratic curves (e.g., a quadratic Bezier curve), which is widely used by TrueType fonts to define character shapes, each curve is defined by three points (e.g., two points that lie on the curve and a third point—referred to as a control point that is located off the curve).

Due to the different types of curves that can be employed, a common curve format is selected to represent the glyphs. For example, operations may be executed (e.g., conversion operations) so glyphs are represented as quadratic Bezier curves (e.g., for presenting TrueType font characters). In another arrangement, conversions operations may be executed to represent glyphs as cubic Bezier curves (e.g., for presenting characters in an OpenType font). As such the font manager 106 can be capable of converting glyphs (or portions of a glyph) represented in one format (e.g., in cubic curves such as cubic Bezier curves) into another format (e.g., into quadratic curves such as quadratic Bezier curves). Due to its conversion capabilities, the font manager 106 can perform conversions to attain different formats (e.g., convert from quadratic Bezier curves into cubic Bezier curves).

Typically, curves of the same type are harmonized; for example, once converted (or not converted) quadratic curves, cubic curves, etc. can be harmonized. For example, a collection of different quadratic curves that represent a glyph can be harmonized into quadratic curves that each share a common number of points (e.g., the same number of control points). By using a common number of points (e.g., control points) for each curve, memory needs for various operations (e.g., data storage, data transmission, etc.) can be reduced. Further, by achieving the commonality, a variable font can be created for representing the character contours (e.g., glyphs, portions of glyphs, etc.).

Referring to FIG. 2, a computing device 200 (e.g., the computer system 100 of FIG. 1) is illustrated as being in communication with a storage device 202 (e.g., one or more hard drives). The computing device 200 is also represented as executing a font manager 204 (e.g., the font manager 106 of FIG. 1) that may be implemented in software, hardware, a combination of software and hardware, etc. In this arrangement, the font manager 204 is illustrated as including two modules, a harmonizer 206 and a variable font producer 208. Additional functionality can be provided by the font manager 204; for example, an editor may be included to assist a designer in defining one or more curves (e.g., quadratic Bezier curves) to represent shapes of font character contours. The harmonizer 206 performs operations such that the same curve type represents each character contour for the variants of the font (e.g., the same curve type represents a bold version of the font, an italic version of the font, etc.). Further, the harmonizer 206 can determine a common number of curves (e.g., quadratic curves) and corresponding points (e.g., control points) for representing character contours. For example, the harmonizer 206 can perform operations such that the same type (e.g., quadratic curves) and number of curves represent a character contour for different font variants (e.g., normal, bold, italic, etc.). Once the font variants are represented with the same type of curves, these representations are provided to the variable font producer 208 for creating a representation of the multiple font variants that is packaged in a single font file. Using a single- or multi-axis design space, each of the variants of the font can be achieved through processing (e.g., interpolation). Once created, the single file containing the variable font can be provided to other computing devices (e.g., user devices) for presenting each font variant (e.g., the bold font, the italic font, etc.). The variable font can also be stored in the storage device 202, for example in a variable font database 210 (e.g., that includes tables of data that define each variable font). The storage device 202 may also hold other types of information; for example, the harmonized versions of the individual font variants (e.g., the bold font being represented by quadratic Bezier curves, the italic font being represented by quadratic Bezier curves, etc.) can be stored in a font variants database 212 for further processing (e.g., conversion into other curve types such as cubic Bezier curves), etc.

In some arrangements, the functionality of the harmonizer 206 and/or the variable font producer 208 may be implemented independent of the font manager 204. For example, the harmonizer 206 and/or the variable font producer 208 may be developed as a stand-alone applications, software tools, etc. that operate in an independent manner. Other functionality can also be provided by the harmonizer 206 and/or the variable font producer 208 (or used in concert with either module). For example, operations may be included to define font subsets (e.g., for instances when less that a complete set of font variants are needed). Curve conversion may also be provided; for example, converting cubic curves (e.g., cubic Bezier curves) into quadratic curves (e.g., quadratic Bezier curves), and vice versa. Along with providing other types of functionality (e.g., creating subsets, curve conversion, etc.), other types of computer architectures may employed; for example, distributed systems may be implemented in which one or more networks (e.g., the Internet) are used for exchanging information such as font characters, contours, etc.

One or more processing techniques may be employed by the harmonizer 208; for example, along with using the same type of curve (e.g., quadratic Bezier curves) to represent each character contour, the same type and number of points (e.g., control points) may be used to represent each character contour. To harmonize character contours, employed techniques may use, for example, geometric techniques that use properties, relationships, etc. of points, lines, angles, etc. Such techniques may employ heuristic methods to harmonize; for example, to appropriately track different variant contours (e.g., a normal contour represented by four quadratic curves, a bold contour represented by three quadratic curves, an italic contour represented by five quadratic curves, etc.) with a common number of curves of the same type (e.g., use five quadratic curves to represent each contour—the normal contour, the bold contour, the italic contour, etc.). Recursive techniques can be used by such heuristic methods. In one arrangement, a geometric technique is used to find control points for a series of quadratic Bezier curves that together approximate a character contour (e.g., a contour of a bold font variant). Intersections between tangents of the contour can be heuristically selected such that a reasonable quadratic solution is attained that satisfies a predefined separation tolerance (e.g., a maximum orthogonal distance between the original contour and the quadratic). The tangent intersections can be recursively manipulated, and when the source contour is covered by the intersections, the potential quadratic solution can be evaluated to determine if appropriate. In some arrangements, the technique used to identify the quadratic curves can be biased to identify solutions with a particular number of control points. For example, the same number of control points can be identified for representing each variant of a character contour (e.g., a normal contour, a bold contour, an italic contour, etc.). Once identified, the same number of quadratic curves can be defined by these control points to harmonize the variants (e.g., to produce a variable font).

Figure 3A:
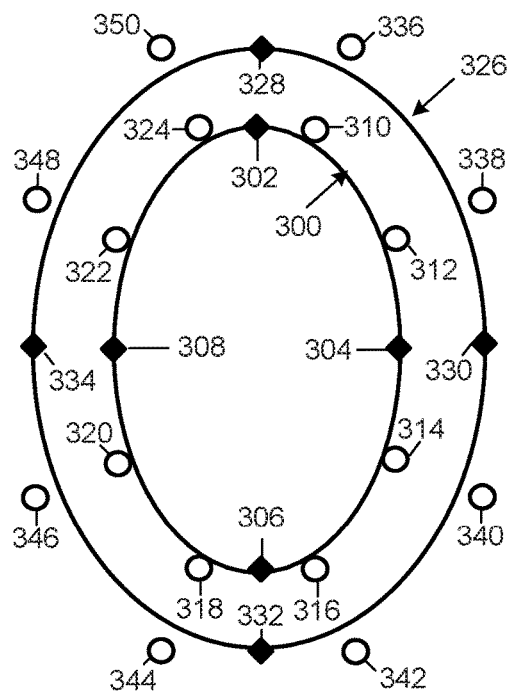
FIGS. 3A-3D illustrates points defining different typographical emphasis of a font character.
Figure 3B:
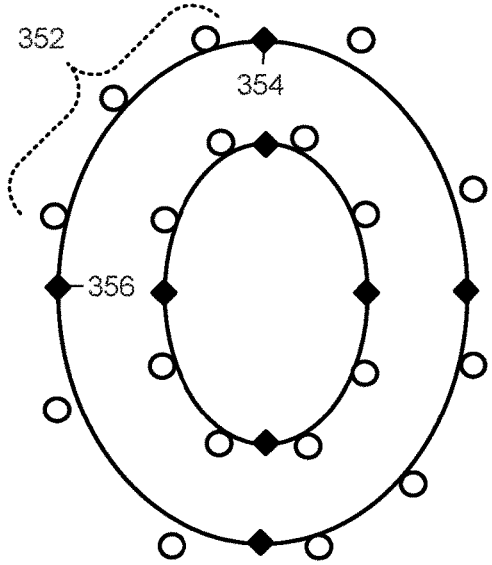
Figure 3C:
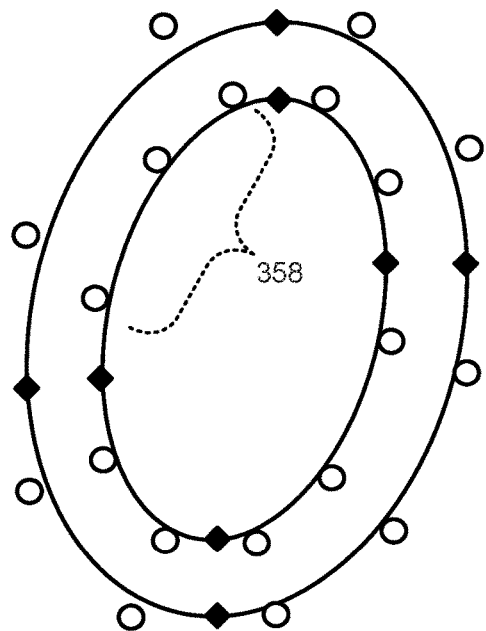
Figure 3D:
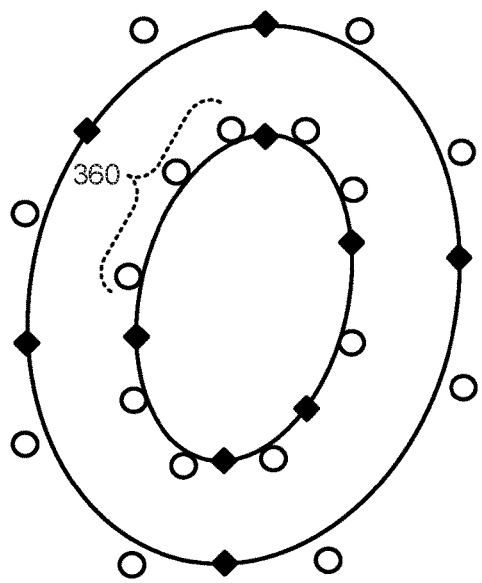
Figure 4A:
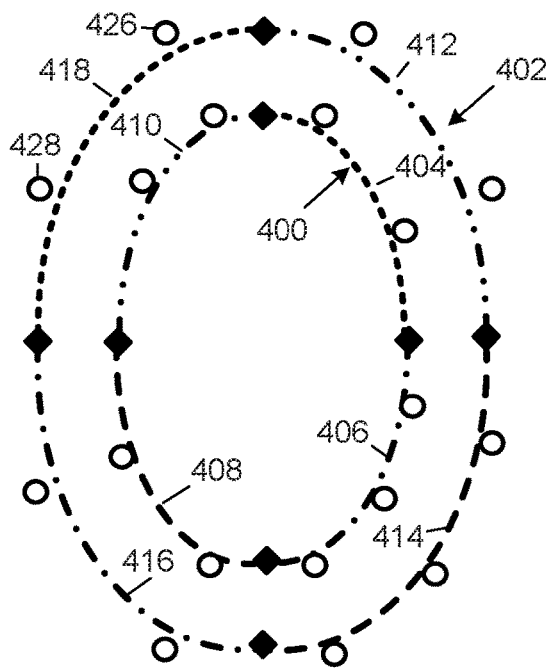
FIGS. 4A-4D illustrates segmenting the font character for each typographical emphasis.
Figure 4B:
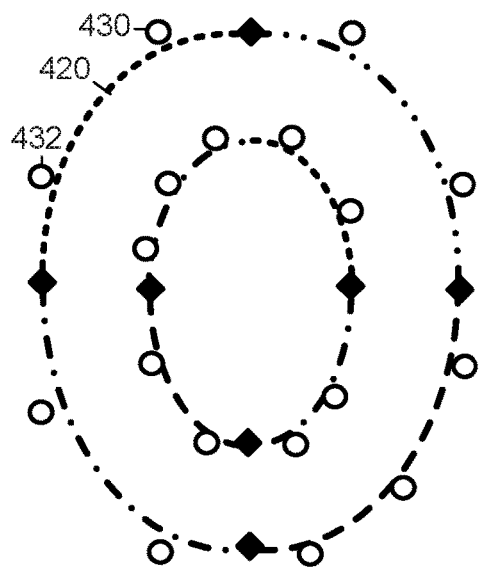
Figure 4C:
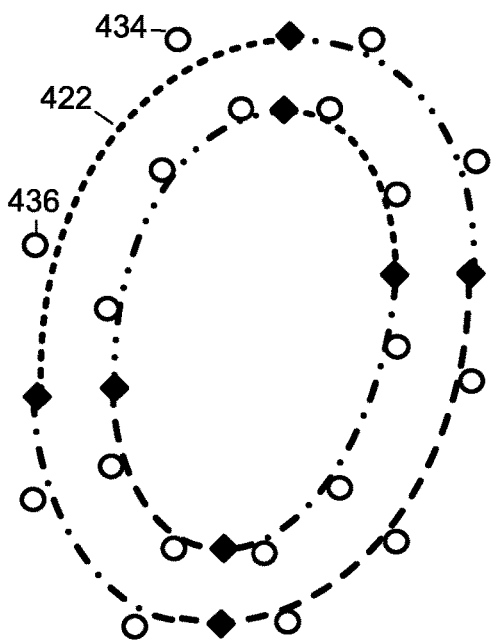
Figure 4D:
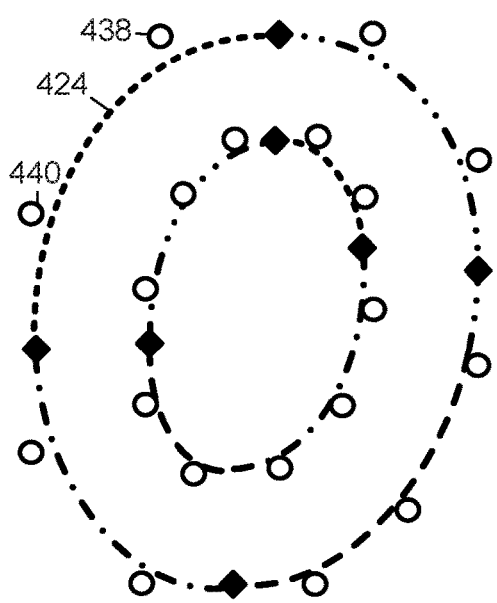

Referring to FIGS. 3A-3D, a character (i.e., the number "0") is presented in four representative variants of a font family. In particular, the character is illustrated in a normal typeface in FIG. 3A, a bold typeface in FIG. 3B, a normal italic typeface in FIG. 3C, and a bold italic typeface in FIG. 3D. In each of these illustrations two types of points are shown that represent the contours of this character. Darken diamonds represent the on curve point of each character contour; for example, an inner contour 300 of the normal typeface character shown in FIG. 3A is represented by four on-curve extreme points 302 (upper extreme), 304 (right most extreme), 306 (lower extreme), and 308 (left most extreme). The inner contour is also represented by off-curve points that are control points that define quadratic curves; in particular, control points 310, 312, 314, 316, 318, 320, 322, and 324 each define an individual quadratic curve (along with implicit on-curve points not shown, but described below). In a similar manner, an outer contour 326 of the character is defined by extreme points 328, 330, 332, and 334. Also similar to the inner contour 300, the outer contour 326 is defined by quadratic curves that include respective control points 336, 338, 340, 342, 344, 346, 348, and 350. Referring to FIGS. 3B, 3C, and 4D, similar points are used to define the contours of the character in the other typefaces (e.g., the bold variant shown in FIG. 3B, normal italic shown in FIG. 3C, and bold italic shown in FIG. 3D). However, different number of curves and different number of points (e.g., control points) may be used to represent the different variants of the fonts. For example, for each of the other three typefaces use a different number of control points in some portions of the respective character contour. Referring to FIG. 3B, three control points (highlighted by bracket 352) are present between extreme points 354 and 356. In comparison, only two control points 348 and 350 are used for the equivalent portion of the normal typeface version of the character (shown in FIG. 3A). Referring to FIGS. 3C and 3D, brackets 358 and 360 respectively highlight that three control points are correspondingly used by the same portion of the character's inner contour when presented in an italic typeface (shown in FIG. 3C) and in a bold italic typeface (shown in FIG. 3D). However, less control points (i.e., two control points) are used in the same portion of the inner contour of the bold italic typeface (shown in FIG. 3B). Referring again to FIG. 3A, the equivalent portion between extreme points 302 and 308 similarly uses only include two control points 322 and 324. Along with different number of control points, the font variants may use different numbers of on-curve points; for example, both the inner and outer contours of the bold italic character shown in FIG. 3D include additional on-curve points compared to the inner and outer contours of the font variants presented in FIGS. 3A, 3B, and 3C. Based upon such differences (e.g., different types of points, different number of points, etc.), the font variants (e.g., normal, bold, italic, bold italic) of this font are not considered to be compatible. To produce a variable font, each of the font variants need to have the same number of points and the same type of points for each contour portion.

Referring to FIGS. 4A, 4B, 4C, and 4D, point compatible versions of the character contours are presented for each of font variants. To attain such compatibility, data representing the font variants shown in FIGS. 3A-3D can be provided to the harmonizer 206 (shown in FIG. 2.). By performing harmonizing operations, the number of on-curve points (e.g., extreme points) and the number of off-curve points (e.g., control points) are equivalent for each of the font variants. Along with the number of points matching among the font variants, the types of points match across the variants. For example, each on-curve point illustrated in FIG. 4A has a corresponding on-curve point in FIGS. 4B-4D. Similarly, each off-curve control point illustrated in FIG. 4A has a corresponding off-curve point in FIGS. 4B-4D.

Referring back to FIGS. 3A-3D, to produce point compatible versions of font variants, the font harmonizer 206 (shown in FIG. 2), performs a series of operations. To initiate the process, each variant of the font is provided to the font harmonizer 206. In this demonstrative example, data representing the four font variants (of the character) presented in FIGS. 3A-3D are provided to the harmonizer 206. Point compatibility can be performed on the entire character or portions of the character. For example, segments of the characters can be defined and point compatibility is determined for each segment across the font variants. Returning to FIG. 4A, both an inner contour 400 and an outer contour 402 are each segmented to include four segments. In particular, inner contour 400 includes segments 404, 406, 408, and 410, and, outer counter 402 includes segments 412, 414, 416, 418. In this example, the on-curve points of each contour are used to define the end points of each segment, however other conventions may be used for defining segments. Further, more or less segments may be used to represent the each of the contours in other example (e.g., two segments for each contour, eight segments for each contour, etc.).

After defining the segments for each contour of the font variants, similarly positioned segments can be identified. For example, each segment located in upper left portion of the outer contour can be identified and associated with segments similarly located in each of the other font variants. As such, segment 418 of the normal font variant shown in FIG. 4A can be associated with segment 420 of the bold font variant shown in FIG. 4B, segment 422 of the italic font variant, and segment 424 of the bold italic variant in FIG. 4D. Similarly, the other segments 404-416 and of the font variant in FIG. 4A have associated segments in the font variants of FIG. 4B-4D.

Once the segments are defined and associated for each of the font variants, the harmonizer 206 analyzes the points of associated segments to harmonize the segments. For example, a particular type of point may be identified for each of the associated segments. In one arrangement, each off-curve point (e.g., control point) of a segment may be identified and counted. In effect, the number of curves (e.g., quadratic Bezier curves) used to represent the segment are counted. Using the illustrated example, segment 418 includes two off-curve control points 426 and 428. Looking to the associated segments, each also has two off-curve control points (e.g., segment 420 has control points 430 and 432, segment 422 has control points 434 and 436, and segment 424 has control points 438 and 440). By identifying the number of off-curve control points, the harmonizer 206 can determine a common number of points that can be used to define each of the segments. In this example, each of the segments 418, 420, 422, and 424 have the same number of control points, so that number of control points (i.e., 2) can be commonly used to define each segment. If the segments don't use the same number of control points, the harmonizer 206 determines an appropriate number of control points capable of defining each associated segment. For example, the harmonizer 206 may determine the minimum number of off-curve control points to define each of the segments. For illustration, assume two control points are needed to define three associated segments (e.g., two control points to define a segment of a normal font variant, two controls points to define the associated segment of a bold font variant, and two control points to define the associated segment of an italic font variant) and three control points are needed to define a fourth associated segment (e.g., three control points to define the associated segment of a bold italic font variant). Provided this data, the harmonizer 206 determines the minimum number of control points to define each of the associated segments. To determine this number, the harmonizer 206 selects the largest number of points needed to define at least one of the segments. In this example, since one of the segments needs three control points to define that segment (i.e., the fourth segment), the harmonizer determines that three control points are needed to define each of the associated segments. By using the same number of control points to define associated segments, the segments are harmonized in the sense that each segment is defined by the same type of points (e.g., control points) and the same number of control points (e.g., three control points).

By harmonizing the associated segments, the character glyphs are harmonized and correspondingly all of the font variants (e.g., normal, bold, italic, bold italic, etc.) are harmonized. Once the variants of a font have been harmonized by the harmonizer 206, data representing the harmonized font can be provided to the variable font producer 208 (shown in FIG. 2) to produce a variable font. For example, the data may be used to create single or multi-axis design (e.g., using one or more tables) that represents each of the variants of the font (and potentially more fonts using interpolation) that are packaged in a single font file.

As mentioned above, the harmonizer 206 determines the appropriate number of points (e.g., control points) to be used to represent associated segments of font variants. Based upon the number determined, the harmonizer 206 may alter the curves that define a segment. For example, a segment may be represented by two curves (e.g., two quadratic Bezier curves) and the harmonizer 206 determines that three curves (e.g., three quadratic Bezier curves, etc.) are needed represent the segment. The harmonizer 206 can perform operations to determine three curves (for the segment) that appropriately fit the original two curves (used to define the segment). In some arrangements, the number of curves selected for representing a character segment may be adjusted based upon a fitness tolerance for matching a segment. For example, the number of curves may be increased to achieve a particular tolerance for a segment associated with a normal variant of a character. Once achieved, the segments associated with other variants of the character segment (e.g., bold, italic, and bold italic versions) can be represented with the same number of curves (used to achieve the tolerance for the normal variant).

Figure 5A:
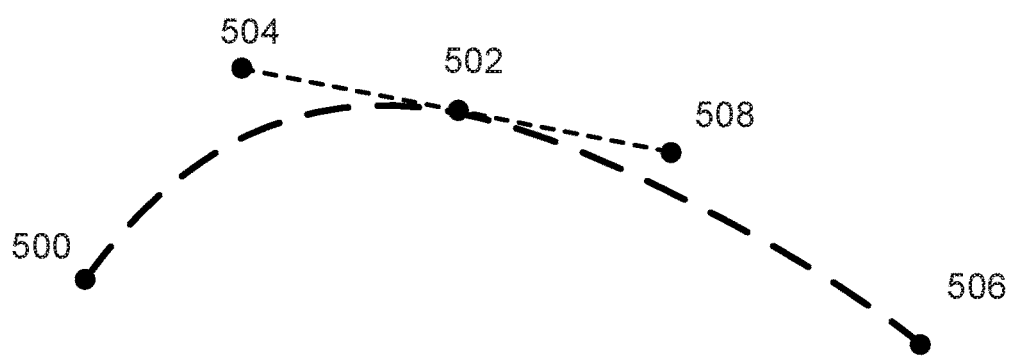
FIGS. 5, 6, 7A-7B and—8A-8D illustrate producing a quadratic Bezier curve for harmonizing segments of a font character.
Figure 5B:
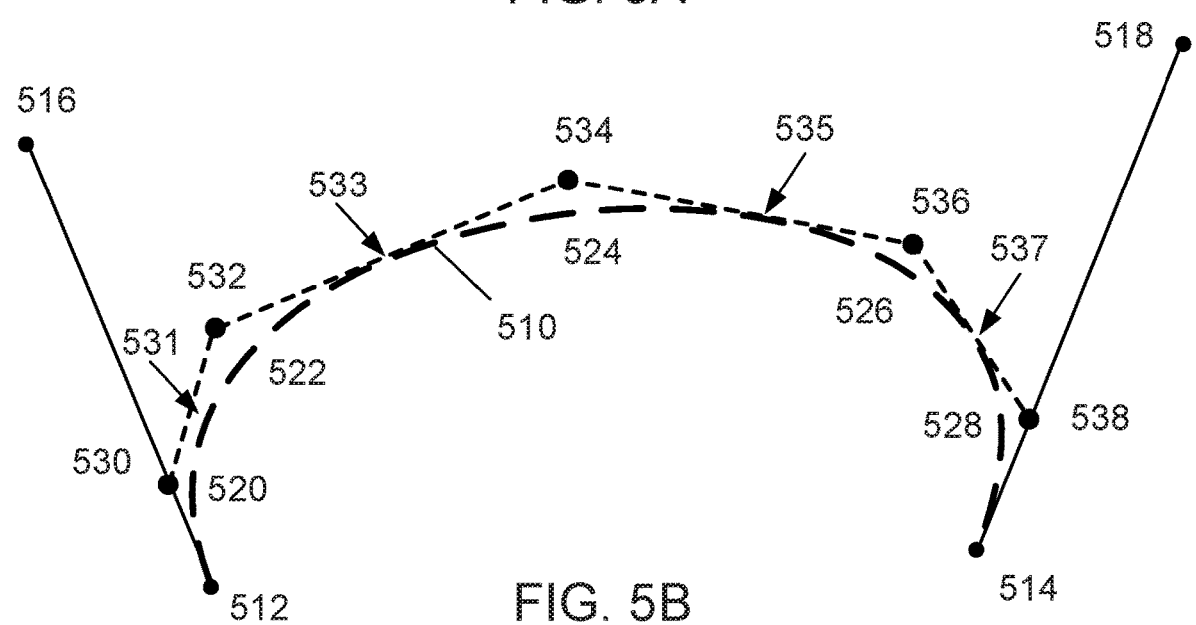
Figure 5C:
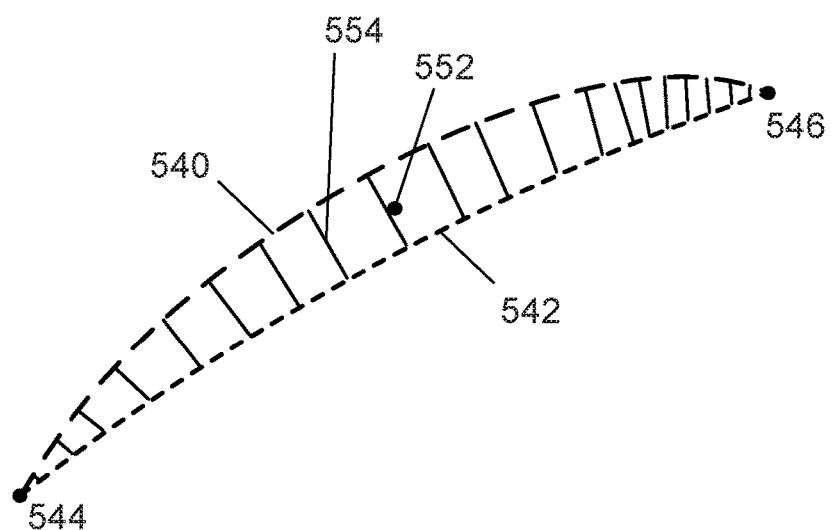

Referring to FIGS. 5A-5C, Bezier curves are graphically illustrated that can be harmonized to define the outline contours of font characters. Series of points are used by the curves to define the outlines. For such Bezier curves, the points can be located on the contours (referred to as "on-curve") or separate from the contours (referred to as "off-curve"). In general, off-curve points represent control points used to define a Bezier curve, and on-curve points represent points located on the contour curves such as the end points of the curves. Referring to FIG. 5A, a quadratic Bezier curve (for TrueType) can be defined by two "on-curve" end points and one "off-curve" control point. In this illustrated example, two quadratic Bezier curves are presented. The first is represented by two end points 500, 502 and a control point 504, and, the second quadratic curve is represented by two on-curve points 502, 506 and a control point 508.

To reduce memory needs, TrueType allows for implicit on-curve points; for example, two off-curve points (e.g., control points) imply an on-curve point that is located at the midpoint of a line between the two off-curve points. As illustrated in the figure, on-curve point 502 is implied from the two off-curve control points 504 and 508. Since the two quadratic Bezier curves share the implicit point 502, the two curves can be encoded for the curve in FIG. 5A from the four points (e.g., points 500, 504, 508, and 506) and point 502 is simply implied. As such, two suitable and adjacent quadratic Bezier curve can be encoded from four points. This technique can be exploited when represent a segment of a character contour for harmonizing variants of a font.

Character contours can also be represented by cubic curves. Referring to FIG. 5B, a cubic Bezier curve 510 is represented by a start point 512, and end point 514 and two control points 516, 518. To represent contours using the same type of curves, the cubic curve (e.g., the cubic Bezier curve 510) can be converted into one or more quadratic curves (e.g., quadratic Bezier curves). In the illustrated example, five quadratic Bezier curves 520, 522, 524, 526, and 528 are used to encode the cubic Bezier curve. Three points are used to define each quadratic Bezier curve: on-curve start point 512, off-curve control point 530, and implicit point 531 (define quadratic Bezier curve 520), off-curve control point 532 and on-curve implicit points 531 and 533 (define quadratic Bezier curve 522), off-curve control point 534 and on-curve implicit points 533 and 535 (define quadratic Bezier curve 524), off-curve point 536 and on-curve implicit points 535 and 537 (define quadratic Bezier curve 526), and, off-curve point 538, implicit point 537 and end point 514 (define quadratic Bezier curve 528). One or more techniques may be employed for such conversions; for example, the techniques described in U.S. patent application Ser. No. 14/993,424, entitled "Converting Font Contour Curves", filed on 12 Jan. 2016 can be used, which is incorporated by reference in its entirety.

In some arrangements, other techniques may be employed to represent the segment to be matched to quadratic curves. For example, straight-line sections (e.g., defined by a piecewise linear function) may be used to represent the segment (or a portion of the segment) with quadratic curves. In the illustrated example, the curve 510 can be represented by a series of line sections (e.g., using a piecewise linear function). Once the contour segment is represented by line sections, the quadratic curves can be fit to the line segments. For example, the minimum number of quadratic curves determined from the font variants (e.g., three quadratic curves) can be fit to the line sections. In situations where the quadratic curves don't appropriately fit the contour segment represented by the line sections, adjustment can be executed. For example, the more line sections (of less length) can be used to represent the contour segment, and the quadratic curves may have a better fit.

Each of the off-curve points is used to define one or more implicit points and can effect multiple quadratic curves (being used to match the curve 510). For example, off-curve point 534 is used to define quadratic Bezier curves 522, 524, and 526. As such, if the location of the off-curve point 534 is adjusted to appropriately fit the curve 510 (e.g., represented by straight-line sections), each of the three quadratic Bezier curve 522, 524, and 526 can be affected. Correspondingly, adjusting the location of off-curve point 534 can trigger a need to also adjust the location of off-curve points 532 and 536 based on their associations via the quadratic Bezier curves 522 and 526. To address the dependence among multiple quadratic Bezier curves, the harmonizer 206 compares newly generated quadratic curves (e.g., curves 520-528) against the curve (e.g., the straight-line sections that represent the curve 510). A difference between the quadratic curves and the curve 510 can be considered acceptable by the harmonizer 206 if the difference amount is within a predefined tolerance for the number of control points (determined for harmonizing the segments of the font variants). For example, if the difference is equivalent to or below a predefined threshold, the quadratic Bezier curves are considered to be appropriately fitting the original curve 510. In some arrangements, two or more thresholds, rule-based decisions or other techniques may be employed to determine if an appropriate fit has been achieved.

Referring to FIG. 5C, one threshold checking technique is graphically illustrated that determines if a curve 540 (represented by line sections from a piecewise linear function) is being appropriately fitted by a quadratic Bezier curve 542. To clearly illustrate a difference between the two curves, the quadratic Bezier curve 542 does not closely fit the curve 540. The curve 540 includes two end (i.e., on-curve end points 544 and 546), and, three points define the quadratic curve 542 (i.e., the on-curve end points 544 and 546, and, one off-curve control point 552). In this example, to evaluate the quadratic curve (for fitting to the curve 540) the allowable difference between the curves is determined from the maximum distance between the two. A series of normal lines (e.g., line 554) are projected from the line segments of the curve 540 to the quadratic curve 542 to provide a fitness measure. In one arrangement, a normal line is projected from the midpoint of each line segment that represents the curve 540 and extends to an intersection point on the quadratic curve 542. The line distances are used to determine if the separation between the curves is within tolerance for fitting the quadratic curve 542 to the curve 540. For example, the largest of the line distances can be compared to the tolerance. In some arrangements, the tolerance is specified by the user, e.g., to represent the closeness of the desired fit. This user provided tolerance can be considered, for example, as the maximal orthogonal distance between the curve and the quadratic curve at points along the curves. By using such a tolerance, the font character shape represented by the quadratic curve approximately tracks the original shape provided by the linear sections representing the curve within this specified tolerance.

Computation efforts can be reduced by reducing the number of iterations of evaluating the fit between two curves. For example, a technique may be employed that exploits that line segments extended between off-curve control points are tangent to the curve. For example, a line segment between the start point of a quadratic Bezier curve and its control point define a tangent to the quadratic curve.

Similarly, a line segment between the end point of a quadratic Bezier curve and the control point defines a tangent to the quadratic curve. Line segments of an evaluated curve also closely approximate tangents to the curve. The number of line segments used by the technique is selected to reduce fitting error. For example, the number of line segments is selected based on the distance between the control points of the curve and the on-curve points being generated.

Figure 6:
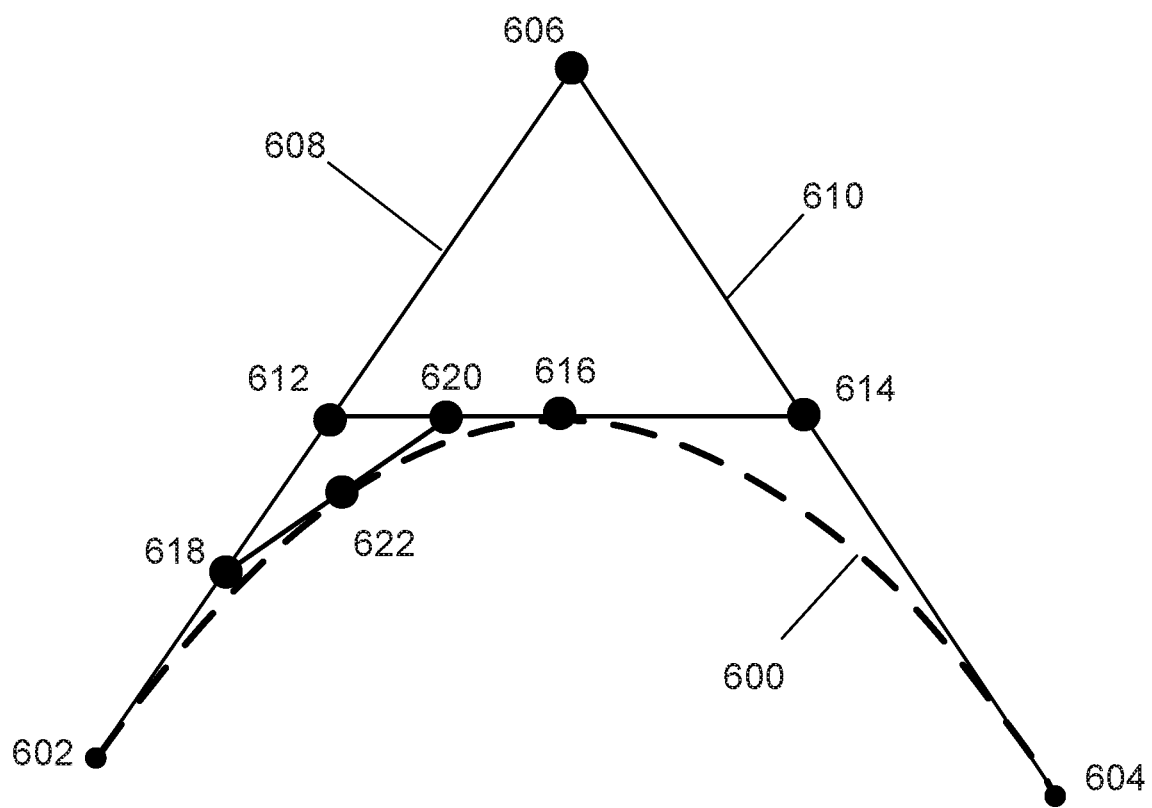

Referring to FIG. 6, one or more techniques may be employed to for creating a number of line segments (from which an amount of error is considered within tolerance). For example, a recursive technique (e.g., that uses De Casteljau's algorithm) may be employed to subdivide a quadratic Bezier curve. As illustrated in the figure, a quadratic curve 600 is defined by a start point 602, and end point 604, and an off-curve control point 606. By extending lines 608, 610 between the points, midpoints 612 and 614 can be identified (e.g., using computationally fast shift operations). Continuing in a similar manner, additional midpoints 616, 618, 620 and 622 can be identified. From these midpoints, the quadratic curve 600 can be subdivided. For example, a quadratic curve defined by endpoints 602, 616 and control point 612 can be subdivided into a first quadratic curve defined by endpoints 602, 622 and control point 618, and, a second quadratic curve defined by endpoints 622, 616 and control point 620.

Figure 7A:
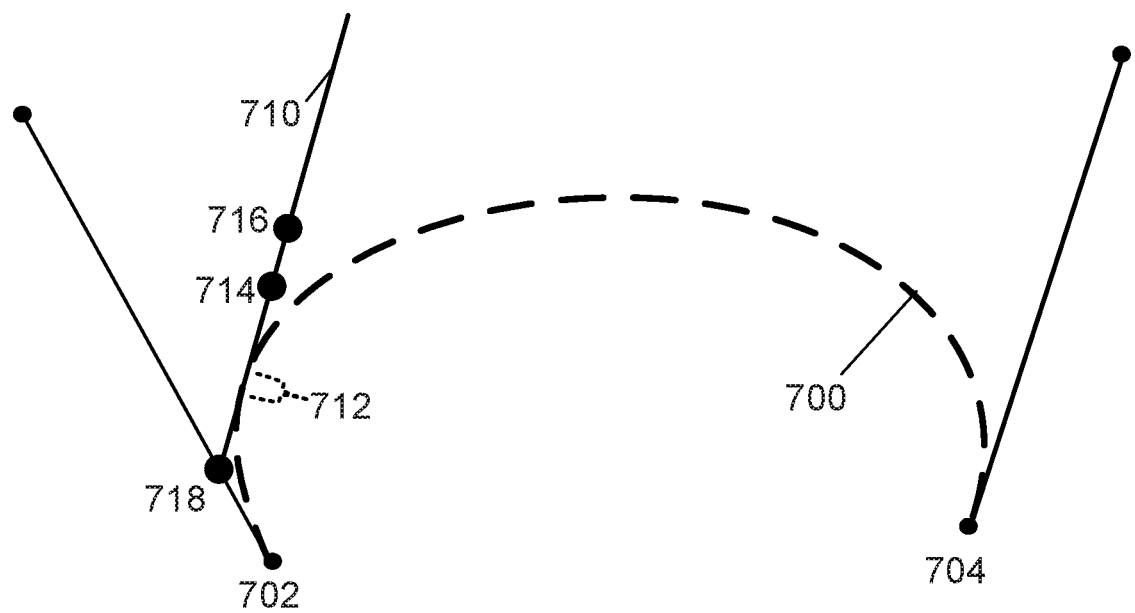

Referring to FIG. 7A, building on the techniques described above, one or more quadratic curves (e.g., quadratic Bezier curves) can be defined to track the shape of a curve (e.g., a piecewise linear representative of a contour segment). As illustrated, a curve 700 (e.g., represented straight-line section provided by a piecewise linear function) includes a start point 702, an end point 704. By using a collection of quadratic curves to track the curve 700, the implicit on-curve points can be determined from the corresponding two off-curve control points (of the quadratic curves). Being implied from the off-curve points, the implicit on-curve points do not need to be represented in the data that defines the quadratic curves, thereby reducing the amount of data (e.g., to be stored, transmitted, etc.). As shown in the figure, a tangent line 710 extends in both directions from a line segment 712 that defines the curve 700. In this particular example, the line segment 712 is the fifth line segment from the starting point 702 of the curve 700. Since an on-curve point on line segment 712 is located at the midpoint between two control points, one of the control points is located between points 714 and 716 (which represent length of the segment 712 located twice the distance from control point 718). As such, any control point located between points 714 and 716 causes an implicit on-curve point to be positioned on the line segment 712. Further, by associating the control point (located between points 714 and 716) with another line segment that is tangent to the curve 700, another quadratic curve can be defined that shares this control point.

Figure 7B:
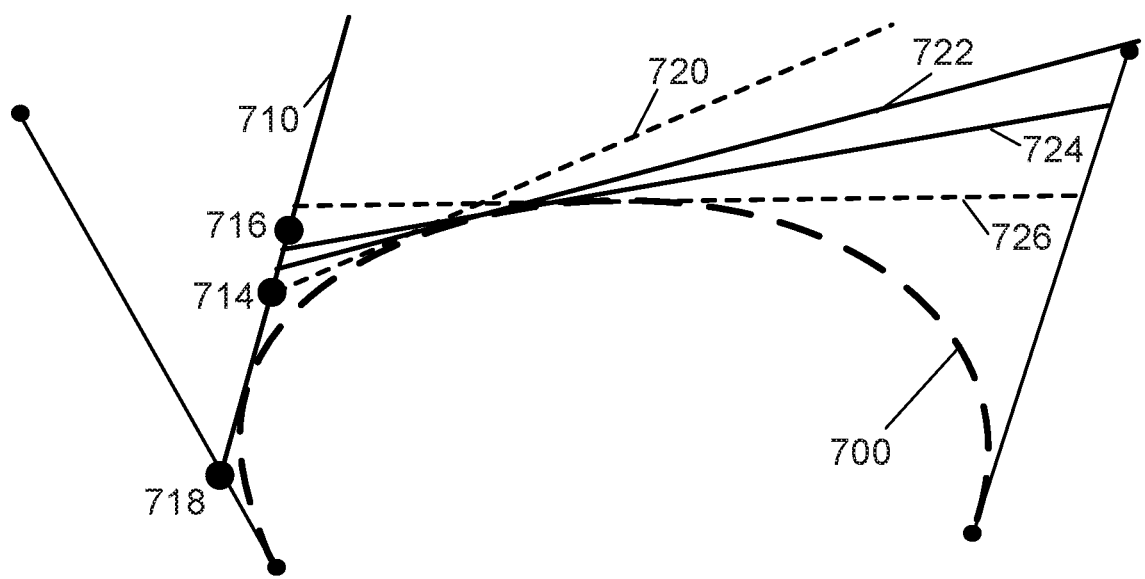

Referring to FIG. 7B, tangent lines are extended from the other line segments that define the curve 700. Dependent upon the location of these segments with respect the line segment 712, the lines may or may not properly intersect with the line 710 to identify the location of a control point. A line that intersects between points 714 and 716 would indicate that the associated segment (that defines the curve 700) could share a control point with the line segment 712. However, a line that does not intersect between points 714 and 716 would not be an appropriate candidate. In this example tangent lines are extended from four other segments that define the curve 700. In particular, line 720 extends from the twelfth line segment of the curve 700 and lines 722, 724, and 726 correspondingly extend from the thirteenth, fourteenth, and fifteenth line segments of the curve 700. Lines 722 and 724 appropriately intersect between points 714 and 716 while lines 720 and 726 fall outside of the proper intersecting range defined by the two points. In this example of the technique, a minimal number of points should be used to encode the quadratic Bezier curve. As such, intersecting segments that are located further along the curve 700 are used. In this case, the fourteenth line segment is further along the curve 700 (compared to the thirteenth line segment) and is used. Continuing to move from left to right along the curve 700, additional line segments (tangent to the curve) are identified that would appropriately provide additional control points to define quadratic curves. In some instances, recursive operations or similar techniques are employed by the harmonizer 206.

Figure 8A:
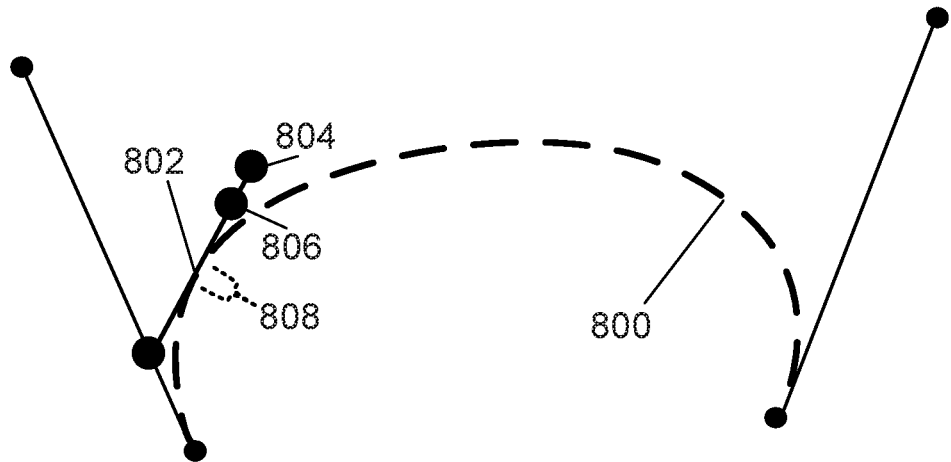
Figure 8B:
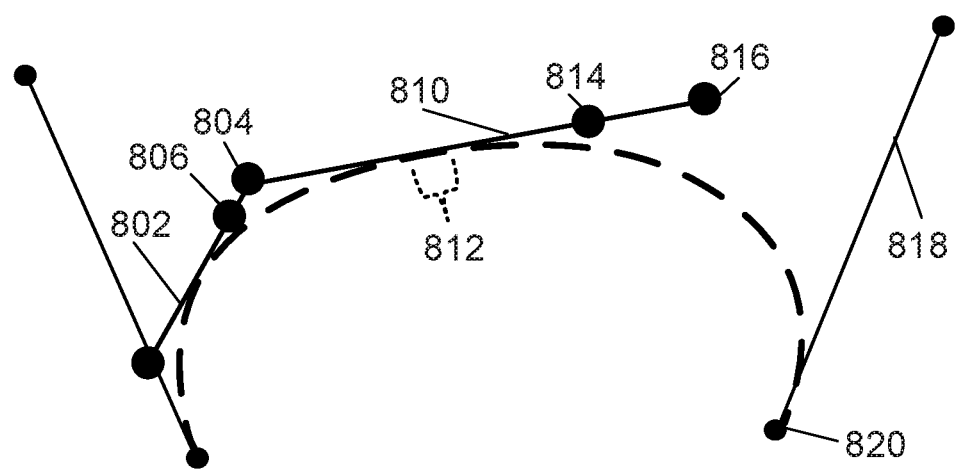
Figure 8C:
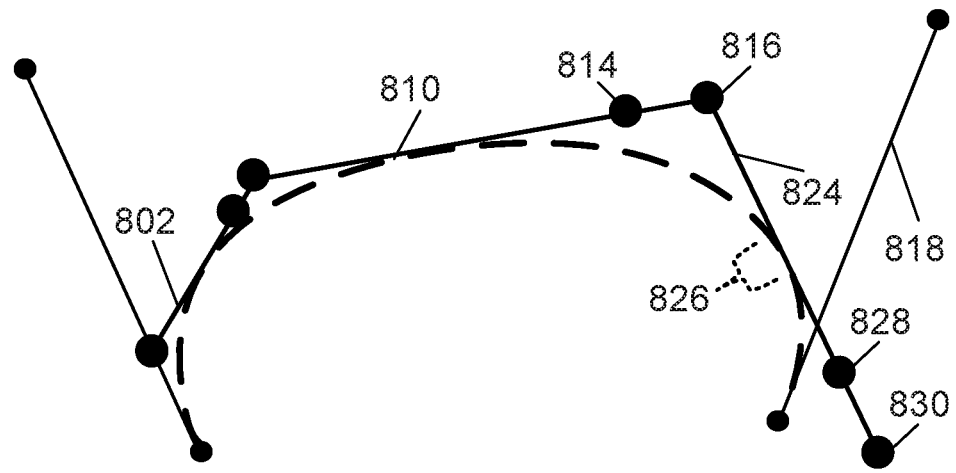
Figure 8D:
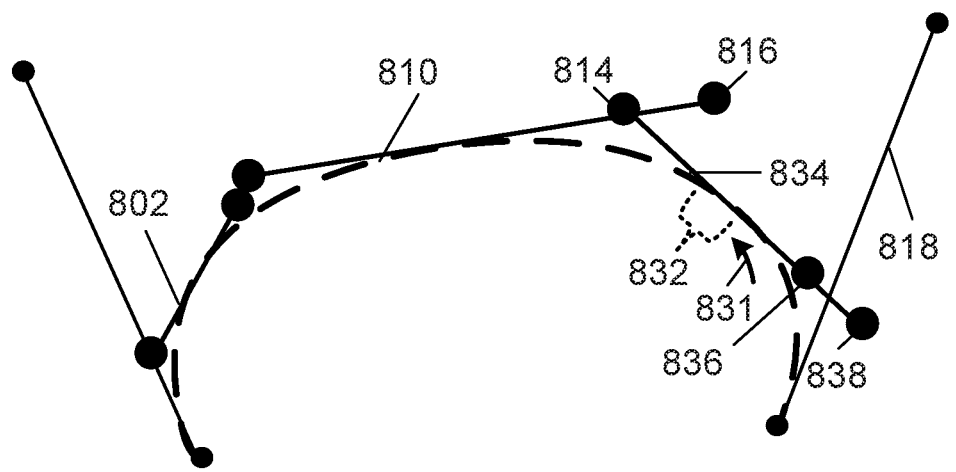

Referring to FIGS. 8A-8D, a series of graphics illustrates recursive operations for identifying control points (for quadratic curves) based upon a predefined tolerance for encoding a curve (represented by straight-line sections). To identify line segments to appropriately fit the curve, each recursive iteration (moving left to right along the curve) generally attempts to add one additional line (tangent to the curve) to the right of the most recently identified tangent line. Line addition is halted if during one iteration, a tangent line is defined that insects the tangent line that extends from the end point of the curve. After halting, all of the previously identified tangent lines are evaluated for determining a goodness of fit with the curve. Referring to FIG. 8A, an initial line 802 is defined that is tangent to a segment 808 of a curve 800 (again represented by straight-line sections). Along the line 802 a target zone is defined (between points 804 and 806) such that a control point located within the zone would properly position an implicit point on the segment 808. Of the segments located further along the curve 800, the selected segment is the one furthest away that a tangent line extends into the target zone. For example, referring to FIG. 8B, line 810 intersects the target zone (between points 802 and 804) and is defined by a segment 812 that is the furthest along the curve 800 (compared to other segments for which a tangent line intersects the zone). Additionally, a second target zone is defined (between points 814 and 816) within which a control point would establish an implicit point on the segment 812 of the curve 800. Along with establishing the second zone, the harmonizer 206 determines if the zone intersects a line 818 that extends from the on-curve end point 820 of the curve 800. In this instance, the line 818 is outside of the second zone (between points 814 and 816). As such, the next recursive iteration is initiated using the line 810. Referring to FIG. 8C, the next iteration is initiated and a line 824 intersects the second zone (between points 814 and 816) and is defined by a segment 826 that is furthest along the curve 800. Along with using the segment to define the line 824, a third zone is defined (between points 828 and 830) from which a control point would establish an implicit point on the segment 826. Similar to previous iteration, the harmonizer 206 checks to determine if the newly defined third zone intersects the line 818 (that is tangent to the end point of the curve 800). In this instance, the third zone extends beyond the line 818 and the third zone is not intersected by the line 818. Upon executing additional recursive iterations, further defined target zones would similarly extend past the line 818. The harmonizer 206 may use one or more techniques to determine that the current target zone has extended beyond the line 818. For example, a comparison of the coordinates of the points that define the third target zone (e.g., coordinates of points 828 and 830) and the coordinates of the line 818 may indicate that the current iteration and additional iterations (involving segments further toward to the end point of the curve) provide a target zone that would extend beyond the line 818. Other techniques may also be employed by the harmonizer 206. Once alerted that the current zone extends beyond the line tangent to the end point of the curve 800 (and the current zone is not intersected), appropriate operations may be executed by the harmonizer 206. For example, a new segment that is located further back on the curve 800 may be used to define a line and a corresponding new target zone that may be intersected (by the line tangent to the curve end point). Referring to FIG. 8D, the process steps back (as represented by arrow 831) and another segment 832 tangent to the curve 800 is identified that still extends a line 834 into the second target zone (between points 814 and 816). In this instance, the segment 832 defines a target zone (between points 836 and 838) that is intersected by the line 818. Alerted that a zone has been intersected by the tangent line extending from the end point of the curve, the harmonizer 206 executes operations to check the quadratic curves provided by lines 802, 810, and 834 against the predefined tolerance for closeness of fit with the curve 800.

Referring to FIG. 9, various types of algorithms may be implemented to perform the operations to identify tangent lines for appropriately fitting a curve at a given tolerance. For example, a listing of pseudo code 900 is illustrated that contains instructions for identifying quadratic curves to track a curve in a recursive manner. In general, the algorithm implemented is stacked-based and determines the tangent lines for fitting the curve and evaluates the produced quadratic curve for a level of closeness.

Figure 10:
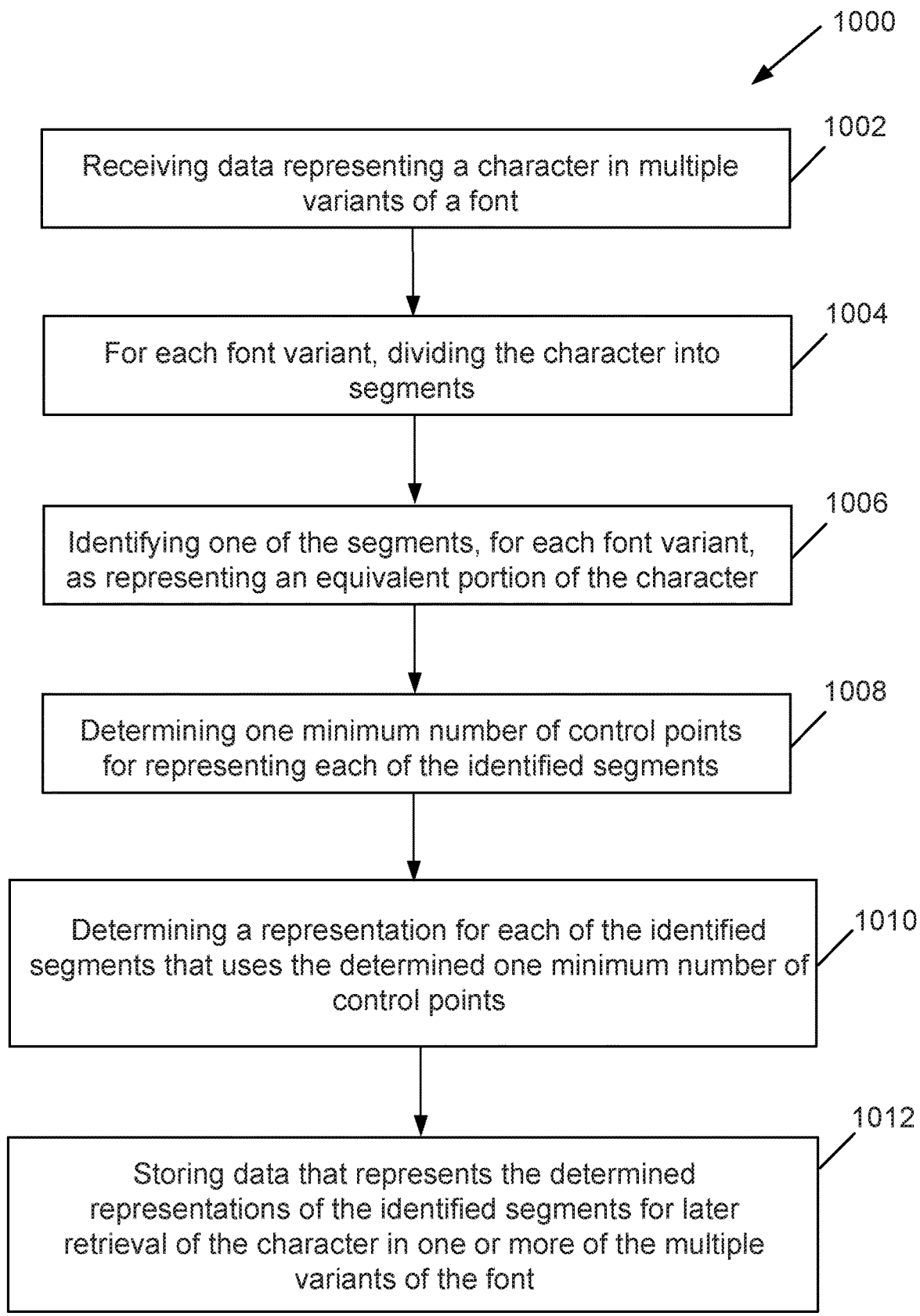
FIG. 10 illustrates a flow chart of operations executed by a font manager.

Referring to FIG. 10, a flowchart 1000 represents operations of the harmonizer 206 included in the font manager 204 (shown in FIG. 2). Operations of the harmonizer 206 are typically executed by a single computing device (e.g., the computer 200); however, operations of the converter may be executed by multiple computing devices. Along with being executed at a single site, execution of operations may be distributed among two or more locations.

Operations of the harmonizer may include receiving 1002 data representing a character in multiple variants of a font. For example, a character represented in normal, bold, italic, and bold italic can be received. Operations of the harmonizer 206 may also include, for each font variant, dividing 1004 the character into segments. For example, contours (e.g., inner and outer contours) of the character can be identified and each contour divided in to quadrants (to identify four segments for each contour). Operations of the harmonizer 206 may also include identifying 1006 one of the segments, for each font variant, as representing an equivalent portion of the character. For example, each segment that represent the upper left quadrant of the outer contour can be identified for each of the four font variants. Operations of the harmonizer 206 may also include determining 1008 one minimum number of curve control points for representing each of the identified segments. For example, reviewing the number of control points (and corresponding the number of quadratic curves) used to represent each segment. For illustration, assume two control points are needed to define three associated segments (e.g., two control points to define the segment of a normal font variant, two controls points to define the associated segment of a bold font variant, and two control points to define the associated segment of an italic font variant) and three control points are needed to define a fourth associated segment (e.g., three control points to define the associated segment of a bold italic font variant). The harmonizer 206 selects the maximum number of control points (e.g., three control points) to determine the minimum number of control points to define each segment. Operations of the harmonizer 206 may also include determining 1010 a representation of each of the identified segments that uses the determined one minimum number of control points. For example, for each these segments (of the font variants), a quadratic Bezier curve having three control points can be determined. Operations of the harmonizer 206 may also include storing 1012 data that represents the determined representations of the identified segments for later retrieval of the character in one or more of the multiple variants of the font. For example, data representing the harmonized font variants can be stored in a database (e.g., the database 212) for later retrieval and processing (e.g., to produce a variable font from the harmonized font variants).

Figure 11:
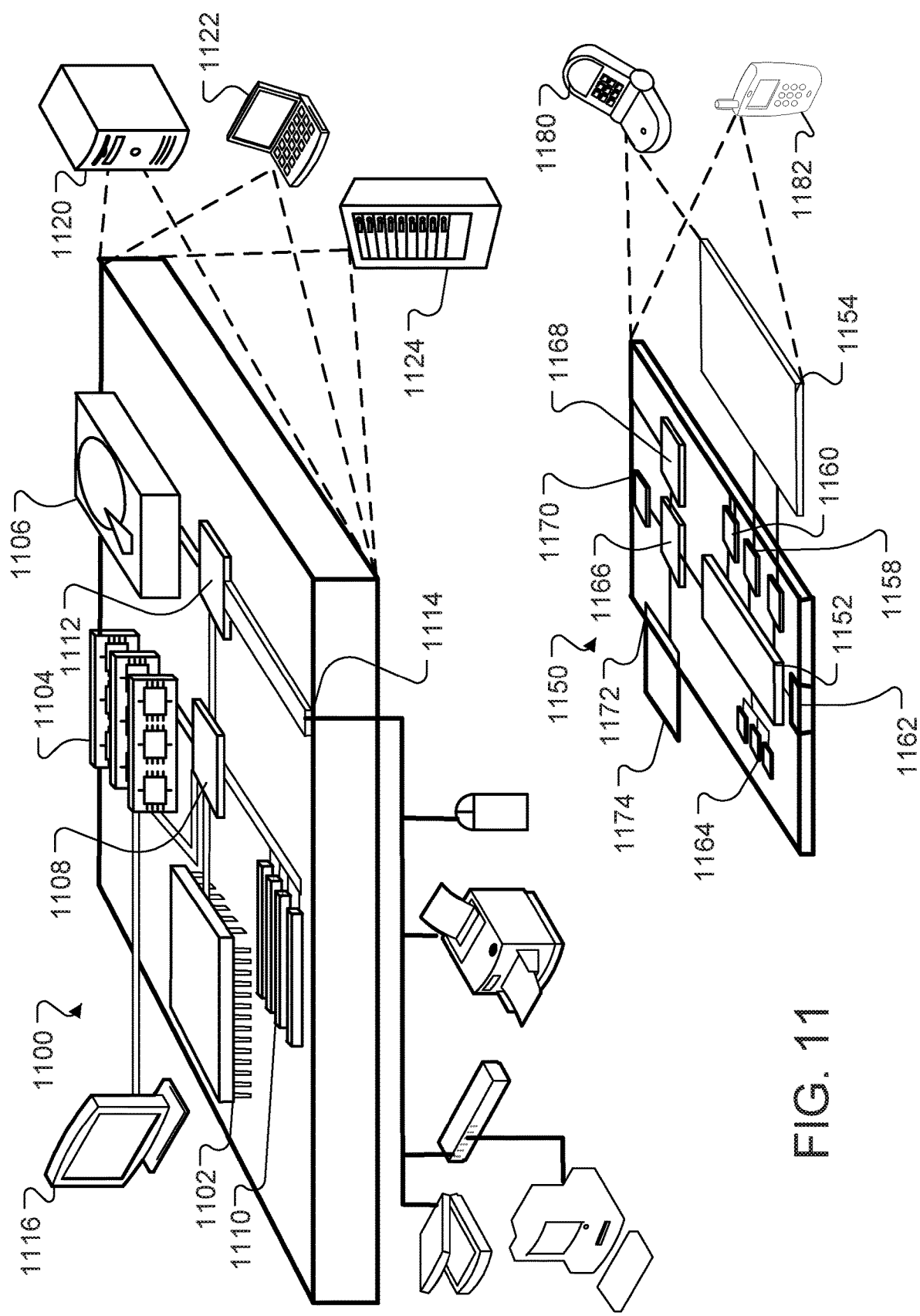
FIG. 11 illustrates an example of a computing device and a mobile computing device that can be used to implement the techniques described here.

FIG. 11 shows an example of example computer device 1100 and example mobile computer device 1150, which can be used to implement the techniques described herein. For example, a portion or all of the operations of the harmonizer 206 (shown in FIG. 2) may be executed by the computer device 1100 and/or the mobile computer device 1150. Computing device 1100 is intended to represent various forms of digital computers, including, e.g., laptops, desktops, workstations, personal digital assistants, servers, blade servers, mainframes, and other appropriate computers. Computing device 1150 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 1100 includes processor 1102, memory 1104, storage device 1106, high-speed interface 1108 connecting to memory 1104 and high-speed expansion ports 1110, and low speed interface 1112 connecting to low speed bus 1114 and storage device 1106. Each of components 1102, 1104, 1106, 1108, 1110, and 1112, are interconnected using various busses, and can be mounted on a common motherboard or in other manners as appropriate. Processor 1102 can process instructions for execution within computing device 1100, including instructions stored in memory 1104 or on storage device 1106 to display graphical data for a GUI on an external input/output device, including, e.g., display 1116 coupled to high speed interface 1108. In other implementations, multiple processors and/or multiple busses can be used, as appropriate, along with multiple memories and types of memory. Also, multiple computing devices 1100 can be connected, with each device providing portions of the necessary operations (e.g., as a server bank, a group of blade servers, or a multi-processor system).

Memory 1104 stores data within computing device 1400. In one implementation, memory 1104 is a volatile memory unit or units. In another implementation, memory 1104 is a non-volatile memory unit or units. Memory 1104 also can be another form of computer-readable medium (e.g., a magnetic or optical disk. Memory 1104 may be non-transitory.)

Storage device 1106 is capable of providing mass storage for computing device 1100. In one implementation, storage device 1106 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 1104, storage device 1106, memory on processor 1102, and the like.)

High-speed controller 1108 manages bandwidth-intensive operations for computing device 1100, while low speed controller 1112 manages lower bandwidth-intensive operations. Such allocation of functions is an example only. In one implementation, high-speed controller 1408 is coupled to memory 1104, display 1116 (e.g., through a graphics processor or accelerator), and to high-speed expansion ports 1110, which can accept various expansion cards (not shown). In the implementation, low-speed controller 1112 is coupled to storage device 1106 and low-speed expansion port 1114. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 1100 can be implemented in a number of different forms, as shown in the figure. For example, it can be implemented as standard server 1120, or multiple times in a group of such servers. It also can be implemented as part of rack server system 1124. In addition or as an alternative, it can be implemented in a personal computer (e.g., laptop computer 1122.) In some examples, components from computing device 1100 can be combined with other components in a mobile device (not shown), e.g., device 1150. Each of such devices can contain one or more of computing device 1100, 1150, and an entire system can be made up of multiple computing devices 1100, 1150 communicating with each other.

Computing device 1150 includes processor 1152, memory 1164, an input/output device (e.g., display 1154, communication interface 1166, and transceiver 1168) among other components. Device 1150 also can be provided with a storage device, (e.g., a microdrive or other device) to provide additional storage. Each of components 1150, 1152, 1164, 1154, 1166, and 1168, are interconnected using various buses, and several of the components can be mounted on a common motherboard or in other manners as appropriate.

Processor 1152 can execute instructions within computing device 1150, including instructions stored in memory 1164. The processor can be implemented as a chipset of chips that include separate and multiple analog and digital processors. The processor can provide, for example, for coordination of the other components of device 1150, e.g., control of user interfaces, applications run by device 1150, and wireless communication by device 1150.

Processor 1152 can communicate with a user through control interface 1158 and display interface 1156 coupled to display 1154. Display 1154 can be, for example, a TFT LCD (Thin-Film-Transistor Liquid Crystal Display) or an OLED (Organic Light Emitting Diode) display, or other appropriate display technology. Display interface 1156 can comprise appropriate circuitry for driving display 1154 to present graphical and other data to a user. Control interface 1158 can receive commands from a user and convert them for submission to processor 1152. In addition, external interface 1162 can communicate with processor 1142, so as to enable near area communication of device 1150 with other devices. External interface 1162 can provide, for example, for wired communication in some implementations, or for wireless communication in other implementations, and multiple interfaces also can be used.

Memory 1164 stores data within computing device 1150. Memory 1164 can be implemented as one or more of a computer-readable medium or media, a volatile memory unit or units, or a non-volatile memory unit or units. Expansion memory 1174 also can be provided and connected to device 1150 through expansion interface 1172, which can include, for example, a SIMM (Single In Line Memory Module) card interface. Such expansion memory 1174 can provide extra storage space for device 1150, or also can store applications or other data for device 1150. Specifically, expansion memory 1174 can include instructions to carry out or supplement the processes described above, and can include secure data also. Thus, for example, expansion memory 1174 can be provided as a security module for device 1150, and can be programmed with instructions that permit secure use of device 1150. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 1164, expansion memory 1174, and/or memory on processor 1152), which can be received, for example, over transceiver 1168 or external interface 1162.

Device 1150 can communicate wirelessly through communication interface 1166, which can include digital signal processing circuitry where necessary. Communication interface 1166 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 1168. In addition, short-range communication can occur, e.g., using a Bluetooth®, WiFi, or other such transceiver (not shown). In addition, GPS (Global Positioning System) receiver module 1170 can provide additional navigation- and location-related wireless data to device 1150, which can be used as appropriate by applications running on device 1150. Sensors and modules such as cameras, microphones, compasses, accelerators (for orientation sensing), etc. may be included in the device.

Device 1150 also can communicate audibly using audio codec 1160, which can receive spoken data from a user and convert it to usable digital data. Audio codec 1160 can likewise generate audible sound for a user, (e.g., through a speaker in a handset of device 1150.) Such sound can include sound from voice telephone calls, can include recorded sound (e.g., voice messages, music files, and the like) and also can include sound generated by applications operating on device 1150.

Computing device 1150 can be implemented in a number of different forms, as shown in the figure. For example, it can be implemented as cellular telephone 1480. It also can be implemented as part of smartphone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device implemented method comprising:
   receiving data representing a character in multiple variants of a font;
   for each font variant, dividing the character into segments;
   identifying one of the segments, for each font variant, as representing an equivalent portion of the character;
   determining one number of curve control points for commonly representing each of the identified segments;
   determining a representation of each of the identified segments that uses the determined one number of control points for commonly representing each of the identified segments; and
   storing data that represents the determined representations of the identified segments for later retrieval of the character in one or more of the multiple variants of the font.

2. The computing device implemented method of claim 1, wherein the representation of each of the identified segments that uses the determined one number of control points is stored in a single variable font data file.

3. The computing device implemented method of claim 2, wherein the single variable font data file stores data representing each of the variants of the font.

4. The computing device implemented method of claim 3, wherein the single variable font data file stores data representing additional variants of the font.

5. The computing device implemented method of claim 1, wherein the one number of control points is the maximum number of control points used by at least one of the identified segments compared to the other identified segments.

6. The computing device implemented method of claim 1, wherein each identified segment is represented by an equal number of control points.

7. The computing device implemented method of claim 1, wherein determining a representation for at least one of the identified segments includes determining one or more curves in a geometric manner that approximately track the shape of the respective segment.

8. The computing device implemented method of claim 7, wherein for each segment, each curve is a quadratic curve.

9. The computing device implemented method of claim 7, wherein for each segment, each curve is a quadratic Bezier curve.

10. The computing device implemented method of claim 7, wherein for each segment, each curve is a quadratic curve and data representing the one or more curves is absent data representing at least one point located at a midpoint between two control points of the quadratic curve.

11. A system comprising:
    a computing device comprising:
      a memory configured to store instructions; and
      a processor to execute the instructions to perform operations comprising:
        receiving data representing a character in multiple variants of a font;
        for each font variant, dividing the character into segments;
        identifying one of the segments, for each font variant, as representing an equivalent portion of the character;

determining one number of curve control points for commonly representing each of the identified segments;

determining a representation of each of the identified segments that uses the determined one number of control points for commonly representing each of the identified segments; and storing data that represents the determined representations of the identified segments for later retrieval of the character in one or more of the multiple variants of the font.

12. The system of claim 11, wherein the representation of each of the identified segments that uses the determined one number of control points is stored in a single variable font data file.

13. The system of claim 12, wherein the single variable font data file stores data representing each of the variants of the font.

14. The system of claim 13, wherein the single variable font data file stores data representing additional variants of the font.

15. The system of claim 11, wherein the one number of control points is the maximum number of control points used by at least one of the identified segments compared to the other identified segments.

16. The system of claim 11, wherein each identified segment is represented by an equal number of control points.

17. The system of claim 11, wherein determining a representation for at least one of the identified segments includes determining one or more curves in a geometric manner that approximately track the shape of the respective segment.

18. The system of claim 17, wherein for each segment, each curve is a quadratic curve.

19. The system of claim 17, wherein for each segment, each curve is a quadratic Bezier curve.

20. The system of claim 17, wherein for each segment, each curve is a quadratic curve and data representing the one or more curves is absent data representing at least one point located at a midpoint between two control points of the quadratic curve.

21. One or more non-transitory computer readable media storing instructions that are executable by a processing device, and upon such execution cause the processing device to perform operations comprising:

receiving data representing a character in multiple variants of a font;

for each font variant, dividing the character into segments;

identifying one of the segments, for each font variant, as representing an equivalent portion of the character;

determining one number of curve control points for commonly representing each of the identified segments;

determining a representation of each of the identified segments that uses the determined one number of control points for commonly representing each of the identified segments; and storing data that represents the determined representations of the identified segments for later retrieval of the character in one or more of the multiple variants of the font.

22. The non-transitory computer readable media of claim 21, wherein the representation of each of the identified segments that uses the determined one number of control points is stored in a single variable font data file.

23. The non-transitory computer readable media of claim 22, wherein the single variable font data file stores data representing each of the variants of the font.

24. The non-transitory computer readable media of claim 23, wherein the single variable font data file stores data representing additional variants of the font.

25. The non-transitory computer readable media of claim 21, wherein the one number of control points is the maximum number of control points used by at least one of the identified segments compared to the other identified segments.

26. The non-transitory computer readable media of claim 21, wherein each identified segment is represented by an equal number of control points.

27. The non-transitory computer readable media of claim 21, wherein determining a representation for at least one of the identified segments includes determining one or more curves in a geometric manner that approximately track the shape of the respective segment.

28. The non-transitory computing device implemented method of claim 27, wherein for each segment, each curve is a quadratic curve.

29. The non-transitory computing device implemented method of claim 27, wherein for each segment, each curve is a quadratic Bezier curve.

30. The non-transitory computing device implemented method of claim 27, wherein for each segment, each curve is a quadratic curve and data representing the one or more curves is absent data representing at least one point located at a midpoint between two control points of the quadratic curve.

* * * * *